April 14, 1970 — W. J. NEILL — 3,505,923
SELF-ADJUSTING HINGE RIVET
Filed Aug. 12, 1968
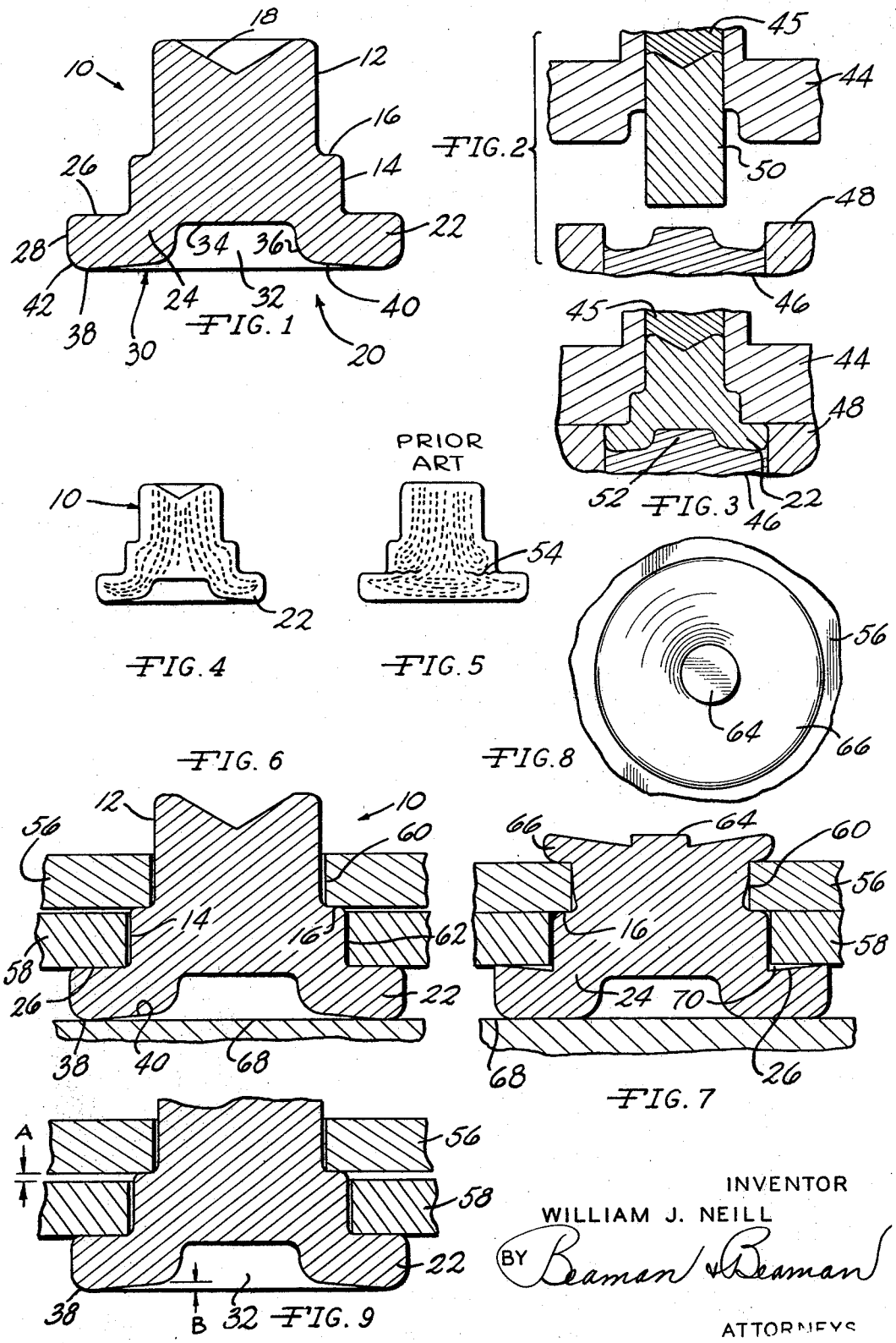
INVENTOR
WILLIAM J. NEILL
BY Beaman & Beaman
ATTORNEYS United States Patent Office 3,505,923
Patented Apr. 14, 1970

3,505,923
SELF-ADJUSTING HINGE RIVET
William J. Neill, Jackson, Mich., assignor to Hancock Industries, Inc., Jackson, Mich., a corporation of Michigan
Filed Aug. 12, 1968, Ser. No. 751,898
Int. Cl. F16b 19/06
U.S. Cl. 85—37            5 Claims

ABSTRACT OF THE DISCLOSURE

A rivet particularly suitable for functioning as a pivot hinge about which contiguous members may be relatively pivoted. The head construction incorporates a self-adjusting feature which compensates for member dimensional tolerances assuring a uniform pivoting action after swaging of the rivet, and the rivet construction is such as to permit swaging upon conventional flat anvil surfaces.

BACKGROUND OF THE INVENTION

The invention pertains to the field of art of rivets utilizing head structure capable of being deformed toward the swaged rivet end for purposes of compensating for material dimensional characteristics of the members being riveted.

In the art of assembly it is often desired to pivot or hinge two members together by utilizing a rivet pivot. This construction is widely used in the automobile industry, and such rivet pivots are used in hood and trunk hinge systems, and the like.

Usually, rivet type pivot hinges are employed to interconnect flat or sheet metal components, such as hinge links and brackets. It is the common practice with this type of rivet to include a shank portion of enlarged diametrical dimension upon which one of the members to be riveted is located, and the shoulder resulting from this portion serves as a locating element for the other member to be riveted wherein said other member is rigidly affixed between this shoulder and the swaged portion of the rivet. Due to dimensional tolerances of the thickness of the sheet metal being hinged together difficulty is often encountered in maintaining uniform hinge characteristics. If the flat stock is at the maximum thickness permitted the hinged connection is usually too "tight" resulting in a binding and excessively high frictional operation of the hinge. If the flat material stock surrounding the enlarged portion of the rivet shank is at the minimum permissable thickness the rivet assembly will result in a hinged construction that is too "loose," and sufficient frictional resistance to operation of the hinge is not obtained.

In order to compensate for this type of problem it is known to "bend" the outer portion of the rivet head toward the swaged end during the swaging of the rivet in order to overcome material thickness variations. The heretofore practice of this procedure has required special anvil configurations which are used during the swaging of the rivet in order to apply the forces to the rivet head at the desired location. The use of such formed anvils is objectionable in that it requires a more time consuming operation since the rivet must be very accurately located within the anvil prior to swaging. Additionally, the anvil is necessarily of a more expensive construction than the normal rivet anvil, and as various sizes and configurations of rivets are used, different anvils must be provided for each rivet size. Thus, an inventory of riveting machine anvils must be maintained, and highly paid set-up men must be available to tool a riveting machine for the particular rivets being used.

Also, the construction of the rivets shown in the aforementioned patents requires more material than is absolutely necessary, and the flow lines of material within these rivets are not such as to provide optimum "push out" and strength charactreistics.

SUMMARY OF THE INVENTION

It is an object of the invention to provide a rivet which is capable of being used as a hinge pivot, and will automatically compensate for material thickness variations in the members being interconnected. Additionally, the rivet of the invention does not require special anvil surfaces upon the riveting apparatus, yet the rivet configuration is no more expensive to manufacture than conventional rivets, and in some instances may be less expensive.

In the self-adjusting rivet in accord with the invention the head of the rivet includes an annular collar portion affixed to the head by an annular hinge zone which permits the collar to be deflected toward the axial direction of the swaging if such a deflection is necessary to compensate for material thickness variations. The collar includes an inner radial surface adapted to engage one of the members being riveted. The opposite side or end of the collar includes means located within the radial dimension of the collar to engage the rivet anvil surface such that the axial forces imposed upon the rivet during swaging will be applied to the collar portion that deflection of the collar may occur, if necessary, to compensate for material thickness tolerances.

In addition, the rivet of the invention may be formed in such a manner as to produce superior material flow lines which result in a high strength, while utilizing a reduced amount of material as compared with conventional rivets.

Another object of the invention is to provide a self-adjusting hinge rivet which utilizes a ring or washer style stake which results in uniform application of pressure forces around the tenon hole of the adjacent member being riveted, requires less upsetting, yet results in higher "push out" pressures as compared with other types of staking, cross staking, for instance.

BRIEF DESCRIPTION OF THE DRAWING

The aforementioned objects and purposes of the invention will be apparent from the following description and accompanying drawing wherein:

FIG. 1 is a diametrical, elevational, sectional view of a rivet formed in accord with the invention, FIG. 2 is an elevatioanl, detail, sectional view of a rivet blank being formed in accord with the preferred method of forming, FIG. 3 is a view similar to that of FIG. 2 illustrating the rivet die components in the completed relationship and illustrating the formed rivet, FIG. 4 is an elevational, diametrical, sectional view of a rivet in accord with the invention illustrating the metal flow lines therein, FIG. 5 is an elevational, sectional view of a prior art rivet illustrating the lines of flow as occur during conventional manufacturing techniques, FIG. 6 is a diametrical, elevational, sectional view of a rivet constructed in accord with the invention having the members to be riveted placed thereon, and prior to swaging, FIG. 7 is an elevational view similar to FIG. 6 after swaging has occurred, FIG. 8 is a top, detail plan view of FIG. 7, and FIG. 9 is a detail view similar to FIG. 6 illustrating significant dimensional characteristics of the invention.

DESCRIPTION OF THE PREFERRED EMBODIMENT

The preferred configuration of a rivet formed in accord with the invention is shown in FIG. 1. The rivet includes a shank generally indicated at 10 of an elongated configuration having a longitudinal axis and including a first cylindrical portion 12, and a second cylindrical portion 14 of an enlarged diameter resulting in a radially extending shoulder 16. Preferably, the end of the shank to be swaged is formed with a conical recess 18.

The rivet includes a head generally indicated at 20, at the other end of the shank with respect to the recess 18. The head includes an annular collar 22 formed integrally with the head and defining an annular hinge zone 24 therewith. The collar 22 includes an "inner" radial shoulder 26 preferably disposed at right angles to the axis of the rivet shank. The collar will usually be of circular configuration being defined by a peripheral edge 28. The side or end of the collar 22 opposite with respect to the surface 26 is indicated at 30 and this side constitutes the anvil engaging side of the rivet head. The preferred construction includes a recess 32 defined by a bottom surface 34 and radiused side wall 36.

The rivet head is constructed such that upon the rivet resting upon the anvil surface a "projection" exists at 38 located upon the collar side 30 and radially aligned with shoulder 26. The projection 38 results from the intersection of a conical surface 40 with the side 30 adjacent the radiused portion 42. Thus, the projection 38 constitutes the "lowermost" location of the rivet as it rests upon an anvil surface. The conical surface 40 is preferably tangential to the curve of the recess side wall 36.

The rivet of the invention may be formed of any conventional material, and in its usual construction will be of steel.

In order to obtain maximum strength and material flow characteristics the preferred embodiment of the rivet may be formed as indicated in FIGS. 2 and 3. In these figures a rivet forming die is shown consisting of an upper portion 44 having a knock out insert 45, a lower plunger portion 46, and a head confining portion 48. The rivet blank 50, consists of a cylindrical member which may or may not have a recess 18 already formed therein. This blank is located within the rivet forming die portion 44, and the die portion 48 will rise to engage portion 44 as shown in FIG. 2. The plunger 46 is then raised to engage the adjacent end of blank 50 and the material of the rivet blank will flow about the plunger projection 52 to the desired configuration illustrated in FIGS. 1, 3 and 4. The portions 44 and 48 then part and knock out insert 45 pushes the rivet from die portion 44.

The resultant method of formation produces metal flow lines as indicated in FIG. 4. By utilizing the recess 32 the metal is not of an undue thickness adjacent the collar 22, and a uniform flow of material exists through the shank portion and into the collar. By using radii at the various intersection of surfaces stress points are minimized and a rivet of unusually high strength characteristics is achieved. FIG. 5 illustrates the flow lines of the material within a conventional rivet, such as the type of rivet shown in the aforementioned patents. The flow lines of this type of rivet are such that the superior strength characteristics do not occur at those area in which the high strength is required, and it is not unusual to experience fracture lines as indicated at 54 when high axial forces are applied to conventional rivets having flow lines as indicated in FIG. 5.

The theory of the operation of a rivet in accord with the invention is illustrated in FIGS. 6 through 8. The flat stock members to be interconnected by a rivet in accord with the invention as to produce a hinging action therebetween are illustrated at 56 and 58. The member 56 is provided with a tenon hole 60 of a diameter slightly greater than the diameter of the diameter of the rivet shank portion 12. The member 58 is provided with a cylindrical hole 62 of a diameter slightly greater than that of the shank portion 14. The axial length of the shank portion 14 is preferably substantially equal to that of the maximum permitted thickness of the member 58.

The thickness of sheet metal of the type often used in the manufacture of automobile hood hinges, for instance, may vary as much as .014 inch, and the axial dimension of the shank portion 14 should be equal to that of the maximum permitted dimension.

In the arrangement shown in FIG. 6 the member 58 is slightly less than the maximum permitted thickness and a gap will therefore exist between the members 56 and 58 as indicated at A in FIG. 9.

After the components are assembled as in FIG. 6 the end of the shank 10 is swaged by a tool, not shown, which produces the ring style stake illustrated. This type of stake results in a cylindrical raised stud 64, FIG. 7, and an annular washer type overlap 66 which extends over the tenon hole 60. As apparent in FIG. 7, radial expansion of the shank portions 12 immediately below the overlap 66 will occur which produces additional interconnection between the rivet and the member 56. Thus, the member 56 will be tightly interconnected to the rivet due to its being clamped between the shoulder 16 and the overlap swaged portion 66. The ring type ring style stake produces a uniform pressure on the member 56 about the hole 60 which resists localized stresses and loosening of the rivet. Additionally, this type of staking minimizes the degree of upsetting of the rivet required and results in superior resistance to failures arising from axial pressures imposed upon the rivet as compared with a cross staking arrangement as is often used.

It will be noted from FIG. 6 that the rivet rests upon the anvil 68 only upon the annular projection 38, and the remainder of the head side 30 will be "above" the anvil surface. As the thickness of the member 58 was less than that required the axial force imposed upon the rivet to produce the staking causes the rivet collar 22 to hinge about the hinge zone 24 of the rivet head producing a permanent deformation in the hinge zone and collar such that the member 58 will be "lifted" toward the member 56, FIG. 7. This deformation of the collar 22 will leave a spacing 70, FIG. 7, as the region of the collar adjacent the peripheral edge 28 will be that deflected to the maximum extent. It will be appreciated that the projection 38 must be located within the radial projection of the width of the shoulder 26, and is preferably located relatively close to the edge 28. As shown in FIG. 7, the conical surface 40 will have "flattened" to substantially correspond to the anvil surface 68. Of course, the particular configuration of the surface 26 after the assembly has occurred will depend on the amount of deformation that has taken place in the collar. In those instances where the member 58 is of maximum thickness, the configuration of the rivet head and collar, after swaging of the rivet, will be substantially identical to that shown in FIG. 6 in that no deformation of the collar is required.

By relating the thickness of the hinge zone 24 to the deformation characteristics of the rivet material, and relating this information to the dimensional characteristics of the rivet, and the desired frictional engagement to be achieved between the members 56 and 58 a uniform rivet hinge connection between members 56 and 58 may be maintained with each assembly, regardless of the dimensional variations, within tolerances, of the members. The less the thickness of the member 58, the greater the deformation that will occur in the hinge zone 24, and the collar 22. The greater the thickness of the member 58, the less deformation that will occur in the head of the rivet.

In a commercial embodiment of the invention it has been found that a 5° deviation of the surface 40 from a right angle with the axis of the shank, as indicated at B, FIG. 9, produces acceptable results. It is, of course, possible to achieve acceptable results within the scope of the invention by forming the projection 38 in a manner other than that described. For instance, the projection 38 could consist of an annular ridge or rib extending about the "outer" side 30 of the collar 22. Also, it would be possible to utilize the inventive concept in rivets which modify or completely eliminate the recess 32.

It is appreciated that various modifications to the invention may be apparent to those skilled in the art without departing from the spirit and scope thereof.

It is claimed:

1. A self-adjusting hinge rivet comprising, in combination, a shank including first and second ends, said shank first end adapted to be swaged, said shank including first and second axial extending portions, said second portion having a greater diametrical dimension than said first portion defining a first radially extending shoulder and located adjacent said second end, a head defined on said shank second end having a diametrical dimension greater than that of said shank second portion, said head including an annular collar outwardly radially disposed beyond said shank second portion and defining a second radially extending shoulder and an anvil engaging side, an annular hinge zone integrally defined on said head affixing said collar to said head, and projection means defining the maximum axial extension of said rivet at said head defined on said collar anvil engaging side located solely within the radial dimensions of said second shoulder limiting initial engagement of said anvil engaging side with an anvil to the radial dimensions of said second shoulder whereby swaging of said shank first end may axially deflect the radial outer regions of said collar toward said first end about said hinge zone and said rivet can fix a first member between said swaged first end and said first shoulder and a second member between said first member and said collar second shoulder and said collar will produce a predetermined frictional engagement of said second member between said first member and said collar second shoulder and compenste for axial dimensional variations in the members being riveted.

2. In a rivet as in claim 1 wherein said head includes a recess defined therein concentric with the axis of said shank, said recess intersecting said anvil engaging side of said collar.

3. In a rivet as in claim 2 wherein said hinge zone is defined intermediate said recess and the intersection of said collar second shoulder and said shank second portion.

4. In a rivet as in claim 1 wherein said projection means comprises an annular axially extending projection defined on said collar anvil engaging side adjacent the periphery of said collar.

5. In a rivet as in claim 4, a conical depression defined in said collar and head coaxial with the axis of said shank, said depression being defined by a surface intersecting said collar anvil engaging side and defining said projection.

References Cited

UNITED STATES PATENTS

| | | | |
|---|---|---|---|
| 101,352 | 3/1870 | Copeley | 85—37 |
| 2,237,338 | 4/1941 | Dale | 85—37 |
| 2,289,221 | 7/1942 | Sorensen | 85—37 |
| 2,646,824 | 7/1953 | Johnson | 85—37 |
| 3,357,084 | 12/1967 | Colautti et al. | 85—37 |

EDWARD C. ALLEN, Primary Examiner